D. PALMER.
Apparatus for Soldering Tin-Cans.

No. 223,946. Patented Jan. 27, 1880.

Witnesses:
F. B. Townsend
Emil H. Drommann

Inventor:
Deloss Palmer
per Wm. H. Lotz
Attorney.

UNITED STATES PATENT OFFICE.

DELOSS PALMER, OF CHICAGO, ILLINOIS, ASSIGNOR TO CRAGIN BROTHERS & CHANDLER, OF SAME PLACE.

APPARATUS FOR SOLDERING TIN CANS.

SPECIFICATION forming part of Letters Patent No. 223,946, dated January 27, 1880.

Application filed September 30, 1879.

*To all whom it may concern:*

Be it known that I, DELOSS PALMER, of Chicago, in the county of Cook and State of Illinois, have invented a new and useful Improvement in Apparatus for Soldering Tin Cans, of which the following is a specification, reference being had to the accompanying drawings.

The nature of my invention relates to devices for soldering the joints of tin cans of the various kinds now extensively used for packing and preserving meat, fruit, oysters, &c.; and it is my object to provide an apparatus upon which cans and other sheet-metal vessels can be soldered with great rapidity, and in a manner to insure a uniform and perfect sealing of the joints with the least amount of soldering metal.

My invention consists, first, in an inclined heating-table, capable of revolution, and adapted to hold and carry a series of cans; and, second, in the combination, with such a table, of a heating device situated below the same, as fully hereinafter explained.

Figure 1:
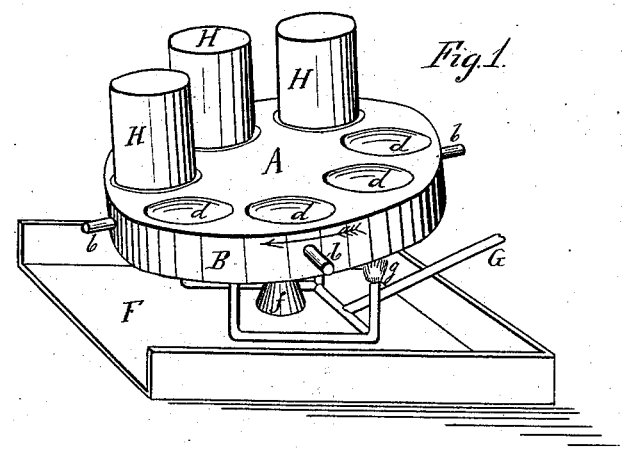
Figure 2:
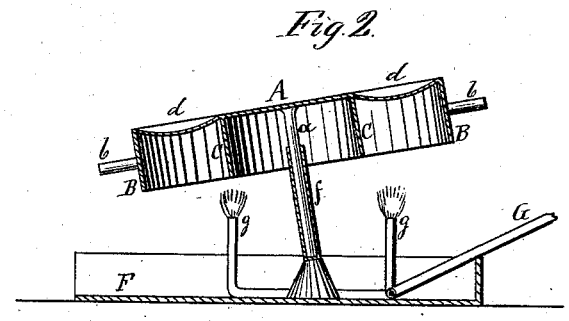

In the drawings, Figure 1 represents an exterior perspective view of my soldering apparatus, and Fig. 2 represents a longitudinal vertical section of the same.

Like letters in the several figures of the drawings designate like parts.

A denotes the circular table, having attached to its bottom side a central axial arbor, $a$, an exterior annular flange, B, with handles $b$ extending radially therefrom, and an interior concentric flange, C. Toward the rim, and in a position between the flanges B and C, the upper face of this table A is formed with a series of recesses, $d$, which are equal distance apart and are shaped to correspond with and to admit the bottom of the cans to be soldered.

A tubular socket, $f$, is secured in an angular position upon the base F for receiving the axial arbor $a$ of table A in a manner to support said table in an inclined position, and to allow the same to be rotated.

G is the gas-supply pipe, and $g\ g$ are the burners, from which jets of burning gas will issue and rise into the annular space between flanges B and C of table A for heating said table to the required temperature necessary for transmitting sufficient heat to the soldering metal to keep it in a fused state while the can remains upon the table.

The table A being sufficiently heated, a can, H, is placed in the recess $d$ at the lower incline of the table, and is supplied with the requisite amount of melted soldering metal, when the table is turned sufficiently for the next recess $d$ to come to the lowest position, into which a second can is placed and supplied with solder, &c., until the first can has been carried around an entire revolution and has reached again the lowest or starting point, when it is removed and replaced by another, this operation being kept up continuously during working hours.

It will be readily understood that in a can thus placed at an incline the soldering metal will flow into and stay in the lowest corner, and that with turning the table what has been the lowest corner will be elevated, and that proportionally as the table is turned the can will be turned until with an entire revolution of said table the soldering metal will have been running over and will have covered every portion of the corner-joint of the can, thereby insuring a perfect job with no more time necessary for the operation than what is required for replacing a can and for supplying it with melted solder.

After determining once the exact amount of soldering metal required for sealing the can-joint it may be measured very accurately, and no such metal needs to be wasted with the use of the above-described apparatus.

For the accurate measurement and quick supply of solder to the can I have invented a tool which I intend to make the subject for separate Letters Patent.

I may find it advantageous hereafter to make that portion of table A having the recesses $d$ a separate piece, to be removably secured to said table, for the purpose of its being interchangeable for soldering different sizes and shapes of cans, thereby obviating the necessity of separate entire tables for each kind and style of cans.

For heating the table A some other device or a grate may be substituted in locations where gas cannot be had, or where it is found rather expensive for such purposes.

Although the recesses $d$ in the table A will prove advantageous for more thoroughly heating the corner-joints of the cans to be soldered, yet they are not of actual necessity, and a table with an entirely plain surface may be used as well, the inclination of the table not being so steep as to cause the cans to slide off.

Having thus described my invention, what I claim as new, and desire to secure by Letters Patent, is—

1. In apparatus for soldering cans, an inclined heating-table capable of revolution, and adapted to hold and carry a series of cans, whereby the operation of soldering may be continuous, the soldering of each can being regularly advanced toward completion as the table revolves, and the soldering of the different cans being in various stages of advancement, according to their position on the table, substantially as described.

2. In apparatus for soldering cans, an inclined table capable of revolution, and adapted to hold and carry a series of cans, in combination with a heating device below the table, whereby the operation of soldering may be continuous, substantially as described and shown.

DELOSS PALMER.

Witnesses:
WILLIAM H. SILLS,
EMIL H. FROMMANN.